US012222268B1

United States Patent
Northam et al.

(10) Patent No.: US 12,222,268 B1
(45) Date of Patent: Feb. 11, 2025

(54) NON-INTRUSIVE RHEOMETER FOR USE IN WELL OPERATIONS

(71) Applicant: WEATHERFORD TECHNOLOGY HOLDINGS, LLC, Houston, TX (US)

(72) Inventors: Paul R. Northam, Houston, TX (US); John E. Busteed, Dubai (AE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 0 days.

(21) Appl. No.: 18/486,717

(22) Filed: Oct. 13, 2023

Related U.S. Application Data

(60) Provisional application No. 63/514,623, filed on Jul. 20, 2023.

(51) Int. Cl.
*E21B 21/08* (2006.01)
*E21B 44/00* (2006.01)
*G01N 11/08* (2006.01)

(52) U.S. Cl.
CPC .............. *G01N 11/08* (2013.01); *E21B 21/08* (2013.01); *E21B 44/00* (2013.01)

(58) Field of Classification Search
CPC ......... E21B 21/08; E21B 47/00; G01N 11/04; G01N 11/08
See application file for complete search history.

(56) References Cited

U.S. PATENT DOCUMENTS

| | | | |
|---|---|---|---|
| 2,771,770 A * | 11/1956 | Bouman | G01N 11/08 73/54.09 |
| 4,557,142 A | 12/1985 | Hensley et al. | |
| 4,700,567 A * | 10/1987 | Frey | E21B 43/2607 73/152.52 |
| 5,297,426 A | 3/1994 | Kane et al. | |
| 5,359,881 A | 11/1994 | Kalotay et al. | |
| 5,661,232 A | 8/1997 | Van Cleve et al. | |
| 7,606,636 B2 | 10/2009 | Dykstra | |
| 7,819,022 B2 | 10/2010 | Hope | |

(Continued)

FOREIGN PATENT DOCUMENTS

| CN | 102374960 A | 3/2012 |
|---|---|---|
| EP | 0540079 A1 | 5/1993 |

(Continued)

OTHER PUBLICATIONS

Kedar M Deshpande, et al.; "Multiphase Flow Modeling of Surface Equipment in Managed Pressure Drilling Operations", SPE-170654-MS, dated Oct. 27-29, 2014, 10 pages.

*Primary Examiner* — Kenneth L Thompson
(74) *Attorney, Agent, or Firm* — Smith IP Services, P.C.

(57) ABSTRACT

A method of determining viscosity can include connecting a bypass flow passage in parallel with a main flow passage, connecting a mass flowmeter and a variable flow restrictor in the bypass flow passage, and connecting at least one viscometer to the bypass flow passage. A rheology measurement apparatus can include a bypass flow passage connected in parallel with a main flow passage, a mass flowmeter connected in the bypass flow passage, and a pipe viscometer connected in the bypass flow passage. Another bypass flow passage may be connected in parallel with the main flow passage, with another mass flowmeter connected in the second bypass flow passage.

20 Claims, 6 Drawing Sheets

(56) References Cited

U.S. PATENT DOCUMENTS

| | | | |
|---|---|---|---|
| 7,832,257 B2 * | 11/2010 | Weightman | E21B 43/267 |
| | | | 73/54.09 |
| 8,392,121 B2 * | 3/2013 | Zamora | G01N 33/2823 |
| | | | 702/50 |
| 9,388,650 B2 | 7/2016 | Leuchtenberg | |
| 9,513,272 B2 | 12/2016 | Larson | |
| 9,518,434 B1 | 12/2016 | Champness et al. | |
| 9,995,098 B2 | 6/2018 | Brana et al. | |
| 10,094,185 B2 | 10/2018 | Dillard et al. | |
| 10,184,305 B2 * | 1/2019 | Lovorn | E21B 44/00 |
| 10,227,838 B2 | 3/2019 | Dillard et al. | |
| 10,527,178 B2 | 1/2020 | Tuineag et al. | |
| 10,539,002 B2 | 1/2020 | Ye | |
| 10,598,527 B2 | 3/2020 | Dillard et al. | |
| 10,712,190 B1 | 7/2020 | Parker et al. | |
| 10,738,552 B1 | 8/2020 | Parker et al. | |
| 10,859,415 B2 | 12/2020 | Munro | |
| 11,378,506 B2 * | 7/2022 | Marum | G01N 11/08 |
| 11,661,805 B2 | 5/2023 | Northam et al. | |
| 11,702,896 B2 | 7/2023 | Northam et al. | |
| 2013/0019673 A1 | 1/2013 | Sroka et al. | |
| 2013/0133948 A1 | 5/2013 | Lovorn | |
| 2014/0005957 A1 | 1/2014 | Pihlaja | |
| 2014/0291023 A1 * | 10/2014 | Edbury | E21B 21/08 |
| | | | 345/440.2 |
| 2015/0152700 A1 | 6/2015 | Lovorn et al. | |
| 2016/0084024 A1 | 3/2016 | Dillard et al. | |
| 2016/0138351 A1 | 5/2016 | Dillard et al. | |
| 2016/0194927 A1 | 7/2016 | Dillard et al. | |
| 2017/0328151 A1 | 11/2017 | Dillard et al. | |
| 2018/0128294 A1 | 5/2018 | Sundararajan et al. | |
| 2018/0291727 A1 | 10/2018 | Van Oort et al. | |
| 2019/0106963 A1 | 4/2019 | Gray et al. | |
| 2019/0234776 A1 | 8/2019 | Dillard et al. | |
| 2020/0190939 A1 | 6/2020 | Gray et al. | |
| 2020/0191626 A1 | 6/2020 | Lacrosse | |
| 2021/0063294 A1 * | 3/2021 | Ye | E21B 21/062 |
| 2022/0065099 A1 | 3/2022 | Johnson et al. | |
| 2022/0282586 A1 | 9/2022 | Northam et al. | |
| 2024/0167347 A1 * | 5/2024 | Olivares Antunez | E21B 21/08 |

FOREIGN PATENT DOCUMENTS

| | | |
|---|---|---|
| WO | 2011/151445 A2 | 12/2011 |
| WO | 2014/007797 A1 | 1/2014 |

\* cited by examiner

NON-INTRUSIVE RHEOMETER FOR USE IN WELL OPERATIONS

BACKGROUND

This disclosure relates generally to equipment utilized and operations performed in conjunction with a subterranean well and, in an example described below, more particularly provides for rheology determination for fluids used in wells.

It can be beneficial to be able to measure rheological properties of fluids used in wells. For example, in managed pressure drilling and other types of well operations, the viscosity of fluid pumped into the well can affect fluid pressure downhole. Since the viscosity can vary over time, and for non-Newtonian fluids the viscosity can vary significantly depending on the flow rate of the fluid, a real time determination of the fluid viscosity is very useful.

Therefore, it will be appreciated that improvements are continually needed in the art of real time rheological property determination, related to fluids used in wells. The present specification provides such improvements, which may also be used in well operations other than managed pressure drilling.

DETAILED DESCRIPTION

Figure 1:
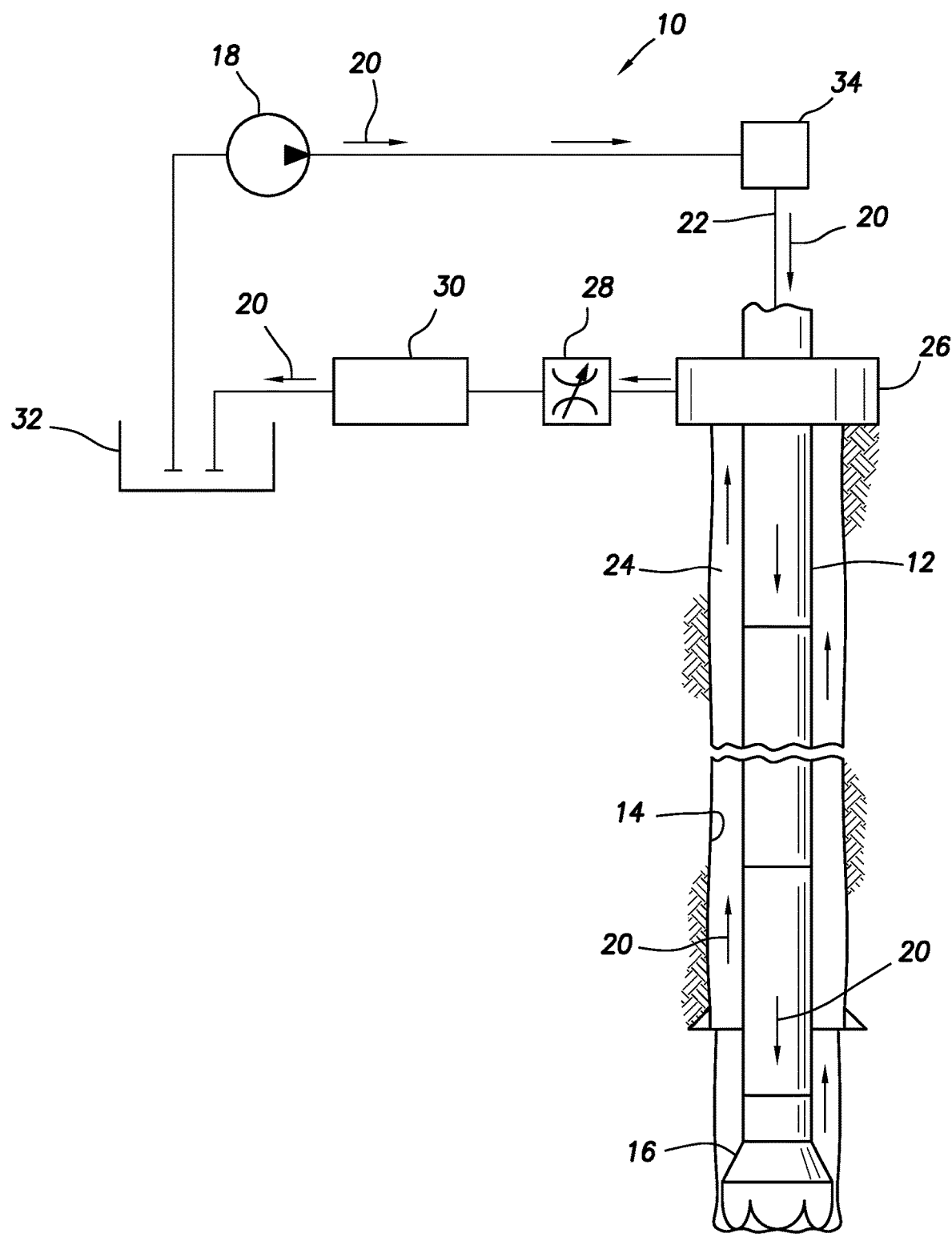
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is positioned in a wellbore 14. The tubular string 12 is a drill string having a drill bit 16 connected at a distal end thereof for the purpose of drilling into the earth. In other examples, the tubular string 12 could be a work string, a stimulation string, a completion string, an injection string, a production string, or another type of tubular string. The scope of this disclosure is not limited to use of any particular type of tubular string in a well, or to use of a tubular string at all.

As depicted in FIG. 1, a pump 18 is used to maintain a fluid flow 20 through the tubular string 12 in the wellbore 14. In this example, the fluid flow 20 enters the tubular string 12 at the surface via a standpipe 22, which may be connected to the tubular string via a top drive, a kelly, or other equipment (not shown). The fluid flow 20 exits the tubular string 12 in the wellbore 14 via nozzles (not shown) in the drill bit 16.

The fluid flow 20 returns to the surface via an annulus 24 formed between the tubular string 12 and the wellbore 14. In managed pressure drilling operations, the annulus 24 may be isolated from the atmosphere at the surface by well equipment 26 known to those skilled in the art as a rotating control device, rotating drilling head, rotating blowout preventer, rotating control head, etc. In well control operations, the well equipment 26 may be an annular blowout preventer, pipe rams, or other equipment. However, the scope of this disclosure is not limited to use of any well equipment to isolate an annulus from the atmosphere at the surface.

The returned fluid flow 20 may pass through a choke manifold 28 and various types of fluid conditioning equipment 30 (such as, a gas separator, a shale shaker, etc.) prior to flowing into a reservoir 32 (also known as a "mud pit"). The pump 18 draws fluid from the reservoir 32. Note that the FIG. 1 example is simplified for purposes of clarity of illustration and description, and those skilled in the art will appreciate that additional equipment or different equipment may be used, depending in part on the particular well operation being performed.

In the FIG. 1 example, a rheology measurement apparatus 34 is connected between the pump 18 and the tubular string 12. Thus, the fluid flow 20 exiting the pump 18 passes through the rheology measurement apparatus 34 and then the standpipe 22 prior to entering the tubular string 12. In this manner, rheological parameters of the fluid flow 20 (and other characteristics, such as, volumetric and mass flow rate, density, other, etc.) can be accurately measured as it is being introduced into the well. In some examples, another rheology measurement apparatus may also measure characteristics of the fluid flow 20 after it exits the well (such as, connected upstream or downstream of the choke manifold 28).

In one aspect of the present disclosure, the rheology measurement apparatus 34 enables the rheological parameters of the fluid flow 20 to be determined, without requiring a flow rate output of the pump 18 to change. The rheological parameters can be determined while the pump 18 flow rate output is at any desired level. In addition, the apparatus 34 is non-intrusive, in that it presents no significant obstruction to the fluid flow 20 from the pump 18 to the standpipe 22.

Figure 2:
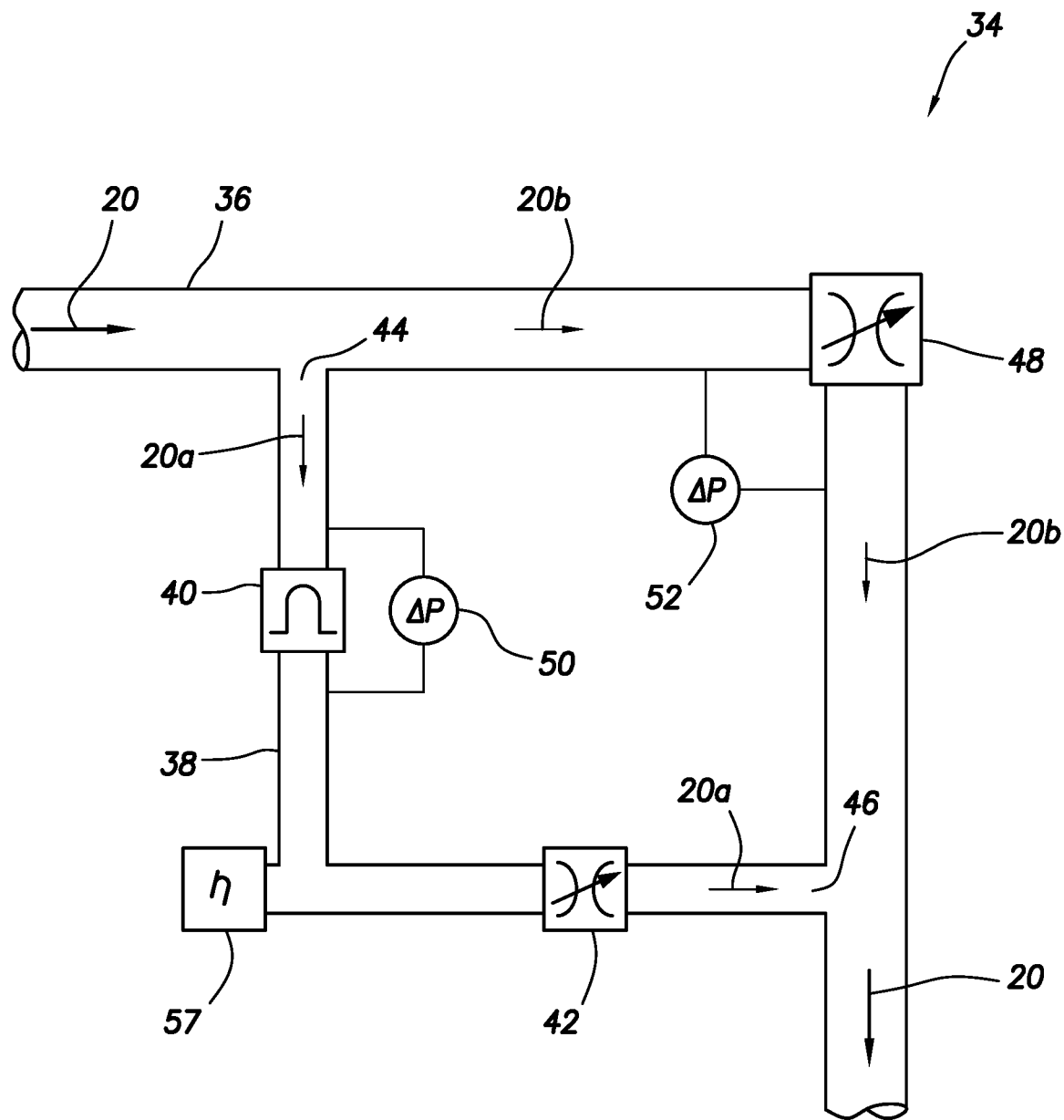
FIG. 2 is a representative schematic view of an example of a rheology measurement apparatus that may be used with the FIG. 1 system and method.

Referring additionally now to FIG. 2, a schematic view of an example of the rheology measurement apparatus 34 is representatively illustrated. The FIG. 2 rheology measurement apparatus 34 may be used with the system 10 and method of FIG. 1, or it may be used with other systems and methods.

The apparatus 34 is similar in some respects to an apparatus described in US publication no. 2022/0282586 assigned to the present applicant. The entire disclosure of this prior application is incorporated herein by this reference for all purposes.

In the FIG. 2 example, the rheology measurement apparatus 34 includes a main flow passage 36 and a bypass flow passage 38 connected in parallel with a section of the main flow passage. A mass flowmeter 40 (such as, a Coriolis flowmeter) and a variable flow restrictor 42 are connected in the bypass flow passage 38. Another variable flow restrictor 48 (such as, a choke) is connected in the main flow passage 36.

An inlet 44 of the bypass flow passage 38 is connected to the main flow passage 36 upstream of the flow restrictor 48. An outlet 46 of the bypass flow passage 38 is connected to the main flow passage 36 downstream of the flow restrictor 48. Thus, a portion 20*a* of the fluid flow 20 enters the bypass flow passage 38 via the inlet 44 upstream of the flow restrictor 48, flows through the mass flowmeter 40 and the flow restrictor 42, and then flows back into the main flow passage 36 via the outlet 46 downstream of the flow restrictor 48.

The flow restrictor 48 in the main flow passage 36 produces a pressure drop from the inlet 44 to the outlet 46, thereby inducing the fluid flow portion 20*a* to flow through the bypass passage 38. A remaining fluid flow portion 20*b* flows through the flow restrictor 48. A ratio of the flow rate of the main fluid flow portion 20*b* to the flow rate of the bypass fluid flow portion 20*a* may be greater than approximately 50:1, but other ratios may be used if desired.

At low flow rates the pressure drop across the mass flowmeter 40 becomes much greater than the pressure drop across the flow restrictor 42. Thus, while the flow restrictor 42 significantly limits the flow rate of the bypass fluid flow portion 20*a* at relatively high flow rates, it has much less influence at relatively low flow rates. The proper sizing of the flow restrictors 42, 48 allows measurements of rheological parameters of a wider range of fluids with varying density and viscosity to be made while improving the accuracy of measurements of the flow rate of the fluid flow 20.

Figure 3:
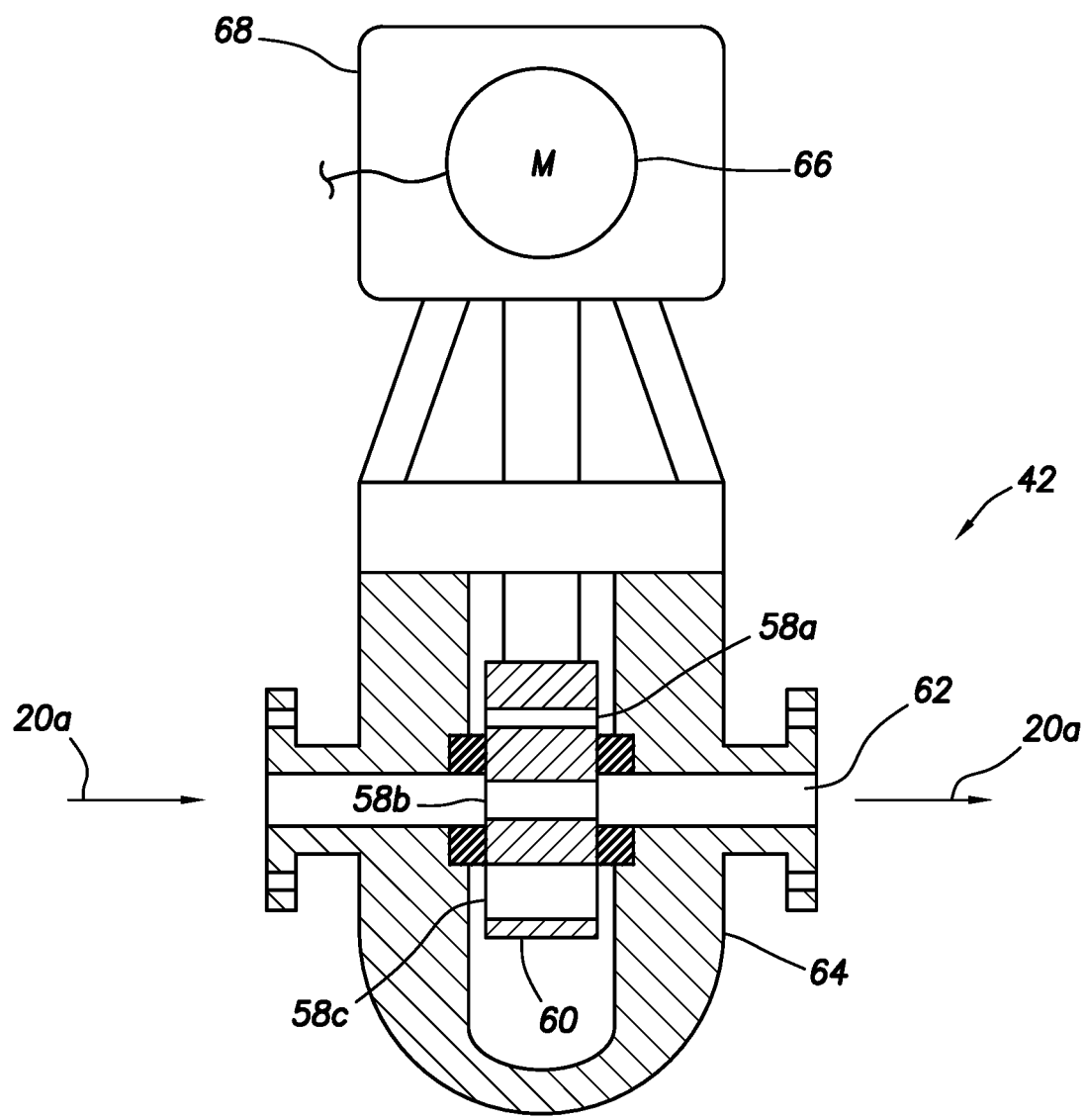
FIG. 3 is a representative cross-sectional view of an example of a gate valve with selective orifice dimensions that may be used with the FIG. 2 apparatus.

In some examples, the flow restrictor 42 could comprise a variable flow restrictor (such as, the variable flow restrictor described in the US publication no. 2022/0282586). Another example of the variable flow restrictor 42 is depicted in FIG. 3 and described more fully below.

To aid in determining rheological parameters of the fluid flow 20, a differential pressure sensor 50 is connected across the mass flowmeter 40 and another differential pressure sensor 52 is connected across the flow restrictor 48. The differential pressure sensor 50 senses a difference in pressure between an upstream side of the mass flowmeter 40 and a downstream side of the mass flowmeter. The differential pressure sensor 52 senses a difference in pressure between an upstream side of the flow restrictor 48 and a downstream side of the flow restrictor.

The sensor 50 facilitates determination of viscosity at the mass flowmeter 40. The sensor 52 facilitates determination of volumetric flow rate through the flow restrictor 48.

Although each of the sensors 50, 52 is depicted in FIG. 2 as being a single sensor, in other examples multiple sensors can be used. For example, the sensor 50 could be replaced by a pressure sensor connected upstream of the mass flowmeter 40 and another separate pressure sensor connected downstream of the mass flowmeter. Thus, the scope of this disclosure is not limited to any particular number or configuration of sensors in the rheology measurement apparatus 34.

In the FIG. 2 example, the sensor 50 is connected to the bypass flow passage 38 upstream and downstream of the mass flowmeter 40. In other examples, the upstream side of the sensor 50 could be connected to the main flow passage 36 upstream of the inlet 44. Similarly, the sensor 52 is connected to the main flow passage 36 upstream and downstream of the flow restrictor 48, but in other examples the upstream and/or downstream side of the sensor 52 could be connected to the bypass flow passage 38 or otherwise connected. The scope of this disclosure is not limited to any particular arrangement or connection of the various elements of the rheology measurement apparatus 34.

The sensors 50, 52 can communicate pressure measurements to a control system 54 (see FIG. 6) via any type of wired or wireless transmission. The control system 54 can be configured to control various aspects of a well operation. For example, in the FIG. 1 system 10 and method, the control system 54 could control operation of the pump 18 and/or the choke manifold 28 in response to outputs produced by the mass flowmeter 40 and the sensors 50, 52. The control system 54 may include mathematical models, algorithms, adaptive learning, artificial intelligence, etc., for computing or determining various types of operational information (such as, bottom hole pressure) and rheological parameters (such as, density or the Herschel Bulkley fluid model parameters $T_O$, k and n).

For non-Newtonian fluids, the Herschel Bulkley model can be expressed as follows:

$$T = T_O + k(du/dy)^n \qquad (1)$$

where T is the shear stress, du/dy is the shear rate, $T_O$ is the yield stress, k is the consistency index, and n is the flow index, or alternatively as:

$$\eta = (T_O/(du/dy)) + k(du/dy)^{n-1} \qquad (1a)$$

where $\eta$ is the apparent viscosity. If the Herschel Bulkley fluid model parameters $T_O$, k and n are known for a particular fluid, then shear stress T and apparent viscosity $\eta$ can be readily calculated and used in the other mathematical models, algorithms, adaptive learning, artificial intelligence, etc., of the control system 54 for determining operational information and controlling the well operation (such as, by adjusting the choke 28 or varying the output of the pump 18).

Pipe frictional models (such as the Darcy model) have been used in past applications to approximate the pressure drop for a given pipe geometry. However, the geometric effects of transitions, elbows, inlets and outlets of the apparatus are more difficult to approximate with a simple theoretical equation, especially when the fluid is non-Newtonian. Computational fluid dynamics (CFD) software can estimate flow across complex geometries, and determine the relationship between pressure drop and the flow rates of the bypass and main fluid flow portions 20*a*,*b*.

The calculations from the CFD software can be based on the Herschel Bulkley non-Newtonian model, where the parameters n, k, $T_O$ are defined along with density. Alternatively, any other non-Newtonian model (such as the Power Law model) could be used.

In one example, the CFD software can generate a robust data table with a wide range of the rheological parameters and densities stored, along with corresponding sets of flow rates in the main and bypass flow passages 36, 38. The data table can consist of enough iterations to allow interpolation between the stored values with a high degree of accuracy.

Flow through the variable flow restrictor 48 can be characterized by a set of Cv curves or tabulated values. For example, the Bernoulli equation may be used:

$$q = C_V/(SG/dp)^{1/2} \qquad (2)$$

where q is flow rate, $C_V$ is flow coefficient, SG is specific gravity, and dp is differential pressure. Thus, a sufficiently accurate determination can be made for the flow rate of the fluid flow portion 20*b*, based on the measurement provided by the differential pressure sensor 52.

Flow through the bypass passage 38 can be characterized using the measurements provided by the mass flowmeter 40 and the differential pressure sensor 50. The mass flowmeter 40 provides measurements of density and mass flow rate for the fluid flow portion 20*a*. Combined with the differential pressure measurements provided by the sensor 50, various techniques may be used for calculating the parameters n, k, To of the Herschel Bulkley or Bingham Plastic model for non-Newtonian fluids. These techniques can include: 1) use a software algorithm to determine a best-fit functional relationship (such as a second order polynomial) for the measured data and the unknown parameters, 2) solve a system of three equations with three unknowns using measurements obtained at three different flow rates, or 3) use a software algorithm to determine a functional relationship between each of the unknown parameters using multiple slopes of a measured flow rate curve.

In the first technique, a software algorithm can be used to determine a best-fit functional relationship between all parameters n, k, $T_O$, SG, and the flow rates in the main and bypass flow passages 36, 38. An example of the functional relationship can be a second order polynomial:

$$\text{fluid flow 20 flow rate}=f(n, k, T_O, SG, \text{fluid flow portion 20a flow rate}) \quad (3).$$

When n, k and $T_O$ are known values, the main flow passage 36 flow rate (fluid flow 20 flow rate) can be calculated without the need of a differential pressure measurement. In the case where the n, k and $T_O$ parameters are known before-hand, a differential pressure measurement can be used as a diagnostic tool to alert when clogging occurs in the bypass flow passage 38, or to determine when the rheological parameters n, k, $T_O$ have changed a predetermined amount or have gone beyond predetermined upper or lower thresholds.

In the second technique, whenever the three values n, k, and $T_O$ are unknown, the flow rate function (3) mentioned above can be used to solve a system of three equations at three known flow rates of the fluid flow portion 20a as follows:

$$\text{fluid flow 20 flow rate 1}=f(n, k, T_O, SG, \text{fluid flow portion 20a flow rate 1}) \quad (4)$$

$$\text{fluid flow 20 flow rate 2}=f(n, k, T_O, SG, \text{fluid flow portion 20a flow rate 2}) \quad (5)$$

$$\text{fluid flow 20 flow rate 3}=f(n, k, T_O, SG, \text{fluid flow portion 20a flow rate 3}) \quad (6)$$

Since the fluid flow 20 flow rate (fluid flow 20 flow rate=fluid flow portion 20a flow rate+fluid flow portion 20b flow rate), the fluid flow portion 20a flow rate and SG are direct measurements in each of the three equations, the three unknown Herschel Bulkley parameters can be determined using a software algorithm that solves the system of three equations.

For example, in a drilling operation, the rig pump 18 output flow rate will be reduced each time a tubular string 12 connection is made. The three flow rates in the above equations (4-6) can result from precise measurement of pressure drop, density and flow rate at three specific points along a flow curve while the pump 18 is slowing down. Such a technique can be realized in practice with a control algorithm and cubic spline interpolation between measured data if desired.

Alternatively, the variable flow restrictor 42 can be used to restrict the flow through the bypass passage 38, so that the three separate measurements of pressure drop, density and flow rate can be made, without changing the output flow rate from the pump 18. In this manner, the well operation can continue uninterrupted, without waiting for a drill string connection to be made.

In the third technique, a software algorithm can be used to determine a functional relationship between each of the Herschel Bulkley parameters individually (n, k, $T_O$) and one specific bypass flow passage 38 flow rate measurement, along with corresponding slopes of the flow curve at multiple flow rates. An example of a polynomial where the measured flow rate data for the bypass flow passage 38 at a first main flow passage 36 flow rate is used along with the slope of the curve at the first main flow passage 36 flow rate, and the slope of the curve at a second main flow passage 36 flow rate would be:

$$n=f(SG, \text{fluid flow portion 20a flow rate, slope1, slope2}) \quad (7)$$

$$k=f(SG, \text{fluid flow portion 20a flow rate, slope1, slope2}) \quad (8)$$

$$T_O=f(SG, \text{fluid flow portion 20a flow rate, slope1, slope2}) \quad (9)$$

The slope of the curve at multiple points could be calculated from a spline interpolation between the measured data points if needed, and the calculation could be made by an automated algorithm.

A large dataset from calculations and measurements can be collected and stored in a multi-parameter array containing the n, k, $T_O$, SG, fluid flow portion 20a flow rate and fluid flow 20 flow rate. The values of unknown parameters may be calculated for example, using a neural network. Alternative algorithmic methods for finding the unknown values include spline interpolation, moving least squares, and kriging.

The techniques discussed above are particularly useful when the well fluid behaves in a non-Newtonian manner, for example, at lower shear rates and corresponding lower flow rates. However, at higher shear rates most well fluids (such as drilling mud) behave like Newtonian fluids. That is, shear stress is substantially proportional to shear rate at higher flow rates.

Referring additionally now to FIG. 3, a partially cross-sectional view of an example of the variable flow restrictor 42 is representatively illustrated. In this example, the variable flow restrictor 42 is in the form of a gate-type valve including multiple orifices 58a-c formed through a gate 60. A flow passage 62 extends through a body 64 and is a part of the bypass flow passage 38 in the FIG. 2 apparatus 34 example.

The orifices 58a-c have different sizes and, thus, restrict the fluid flow portion 20a at different levels. When the smallest orifice 58a is aligned with the flow passage 62, the fluid flow portion 20a is most restricted and the flow rate through the bypass flow passage 38 is at a relatively low level. When the largest orifice 58c is aligned with the flow passage 62, the fluid flow portion 20a is least restricted and the flow rate through the bypass flow passage 38 is at a relatively high level. When the intermediate orifice 58b is aligned with the flow passage 62, the flow rate through the bypass flow passage 38 is at a corresponding intermediate level.

Thus, the variable flow restrictor 42 can be used to change the flow rate through the bypass flow passage 38 when desired. Due to the fixed size orifices 58a-c, the variable flow restrictor 42 can be used to produce known, repeatable restrictions to the fluid flow portion 20a. A Cv curve of the variable flow restrictor 42 can be known with a high degree of accuracy at each of its orifice positions.

However, in other examples, other types of variable flow restrictors (such as, a choke) may be used. Although three orifices 58a-c are depicted in FIG. 3, any number of orifices may be used as desired.

Figure 6:
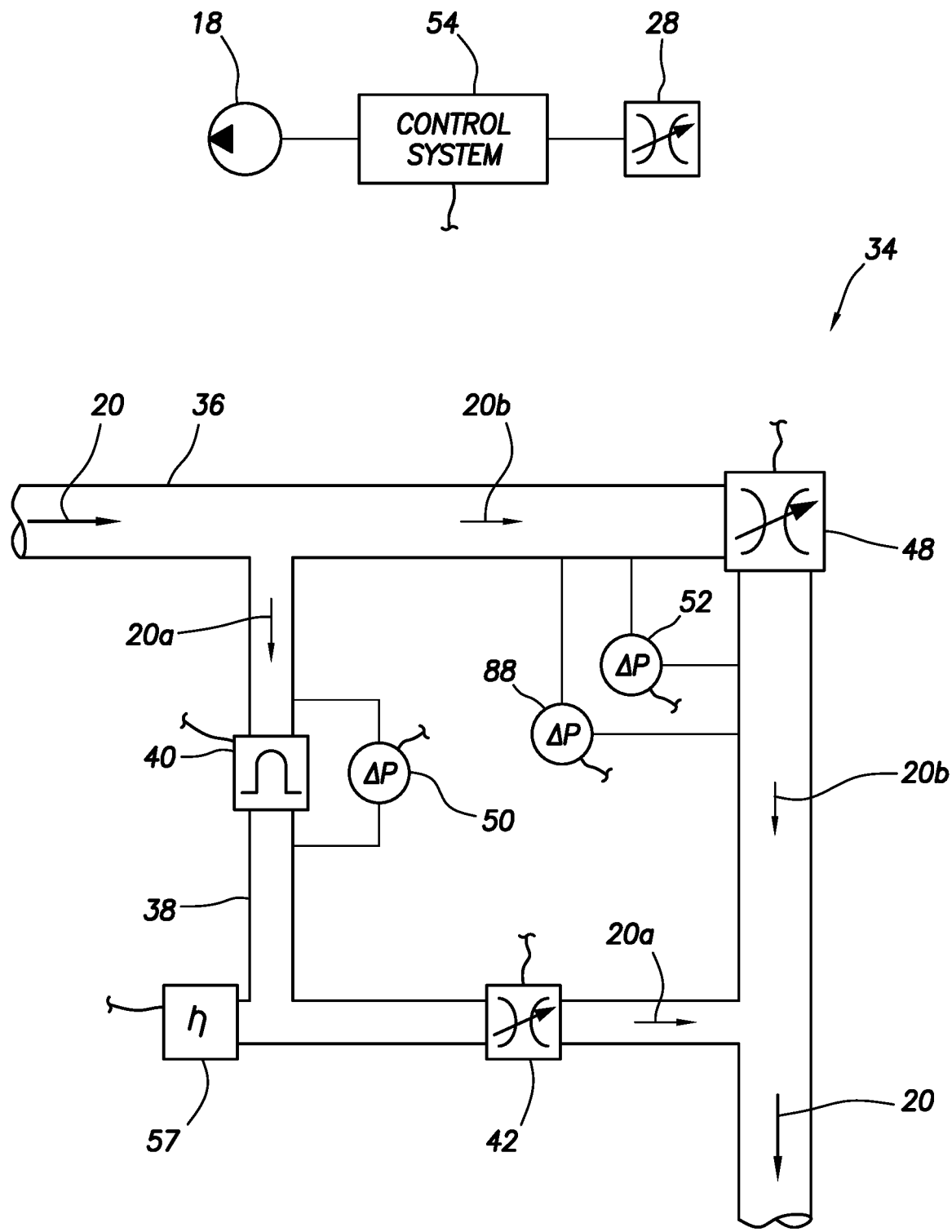
FIG. 6 is a representative schematic view of another example of the rheology measurement apparatus.

Operation of the variable flow restrictor 42 may be controlled by the control system 54 (see FIG. 6). For example, a motor 66 of a valve actuator 68 can be connected to the control system 54.

The motor 66 can be operated by the control system 54 to displace the gate 60, so that a particular one of the orifices 58*a-c* is aligned with the flow passage 62, or so that the orifices are aligned with the flow passage one after the other in succession to produce a corresponding succession of different flow rates in the bypass flow passage 38. Measurements provided by the mass flowmeter 40 and the sensors 50, 52 can be recorded at each of the successive flow rates.

Figure 4:
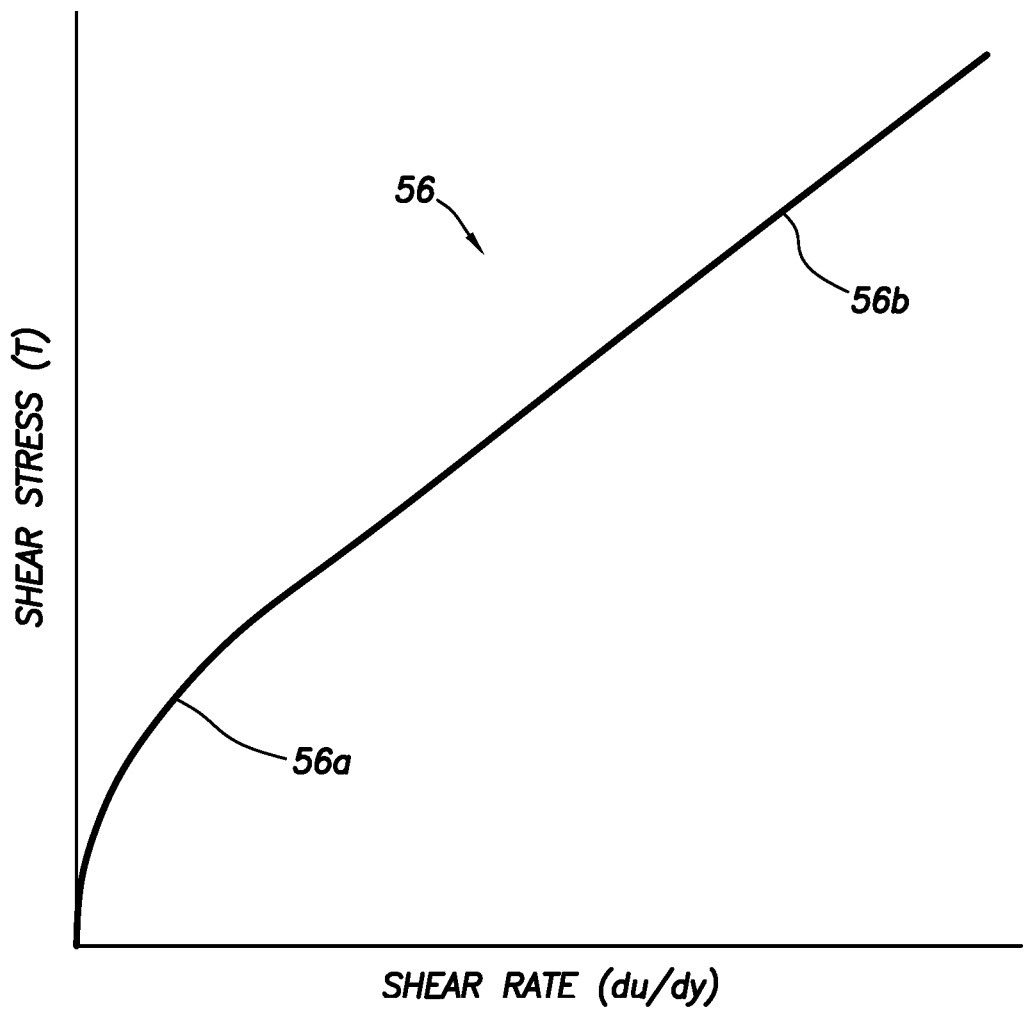
FIG. 4 is a representative graph of shear stress versus shear rate for an example of a non-Newtonian well fluid.

Referring additionally now to FIG. 4, an example graph 56 of shear stress T versus shear rate x for a typical non-Newtonian well fluid is representatively illustrated. However, it should be clearly understood that the graph 56 is merely representative and the scope of this disclosure is not limited to any particular features or shape of the FIG. 4 graph for any particular well fluid.

As depicted in the FIG. 4 example, a portion 56*a* of the graph 56 at relatively low shear rates x exhibits non-Newtonian characteristics. For example, the relationship between shear stress T and shear rate x is not proportional. This portion 56*a* of the well fluid behavior can readily be characterized, for example, using a second order polynomial expression, as discussed above.

However, at relatively high shear rates x, a portion 56*b* of the graph 56 exhibits Newtonian characteristics. The relationship between shear stress T and shear rate x is substantially proportional. In this portion 56*b* of the graph, the relationship between shear stress T and shear rate x can be accurately characterized by a slope of the shear stress T versus shear rate x graph portion 56*b*.

Referring again to FIG. 2, the rheology measurement apparatus 34 includes a viscometer 57 of the type suitable for measuring the viscosity n of Newtonian fluids. The viscometer 57 is connected to the bypass flow passage 38, so that the viscometer can accurately measure the viscosity n of the fluid in the bypass flow passage while the fluid is exhibiting Newtonian characteristics, such as, at relatively high flow rates of the fluid flow 20*a* through the bypass flow passage.

As discussed above, the viscosity n of the fluid in the bypass flow passage at relatively low flow rates can be determined or estimated using the Herschel Bulkley non-Newtonian model. Using the FIG. 3 variable flow restrictor 42 (or the variable flow restrictor described in the US publication no. 2022/0282586, a choke, etc.) to vary the flow rate of the fluid flow 20*a* through the bypass passage 38, and the viscometer 57 to measure the viscosity n at relatively high flow rates, the Herschel Bulkley exponential curve fit can be more accurately defined, without any need to change the flow rate output of the pump 18. Thus, a well operation can proceed unimpeded while the exponential curve fit is determined in real time, thereby providing a real time determination of the fluid viscosity.

A technique may be used to mitigate any zero drift error of the differential pressure measurements provided by the sensor 50 in this method. When a real time viscosity curve is desired, the variable flow restrictor 42 is shifted to allow a minimum shear rate ẏ1 through the flowmeter 40. After a pressure drop is measured by the sensor 50 for a given amount of time, the variable flow restrictor 42 is operated to allow another shear rate ẏ2 through the flowmeter 40, then after taking another differential pressure measurement for the same length of time, the variable flow restrictor 42 is shifted again to allow the minimum shear rate ẏ1 through the flowmeter 40. After each subsequent differential pressure measurement is taken (for example, at shear rates ẏ3, ẏ4, etc.), the variable flow restrictor 42 is reset back to the initial position (at shear rate ẏ1) and the differential pressure measurement is compared against the latest differential pressure measurement at shear rate ẏ1. Thus, using four different shear rates (ẏ1, ẏ2, ẏ3, ẏ4), differential pressure measurements would be taken at the following succession of shear rates: ẏ1, ẏ2, ẏ1, ẏ3, ẏ1, ẏ4, ẏ1.

By comparing the initial reference point to each subsequent measurement, the effects of zero drift can be mitigated for all of the differential pressure measurements at shear rates ẏ2, ẏ3, ẏ4, etc., and a real time determination of k and n for the Herschel Bulkley viscosity curve (see equation 1a) can be kept up to date, without reducing flow across the mass flowmeter 40 down to zero. In this implementation, the last known yield stress Ty can be stored in system memory and used for the viscosity curve fit, and can be updated whenever the flow rate in the main flow passage 36 drops to zero (such as, during make-up of another stand of drill pipe in a drilling operation).

Figure 5:
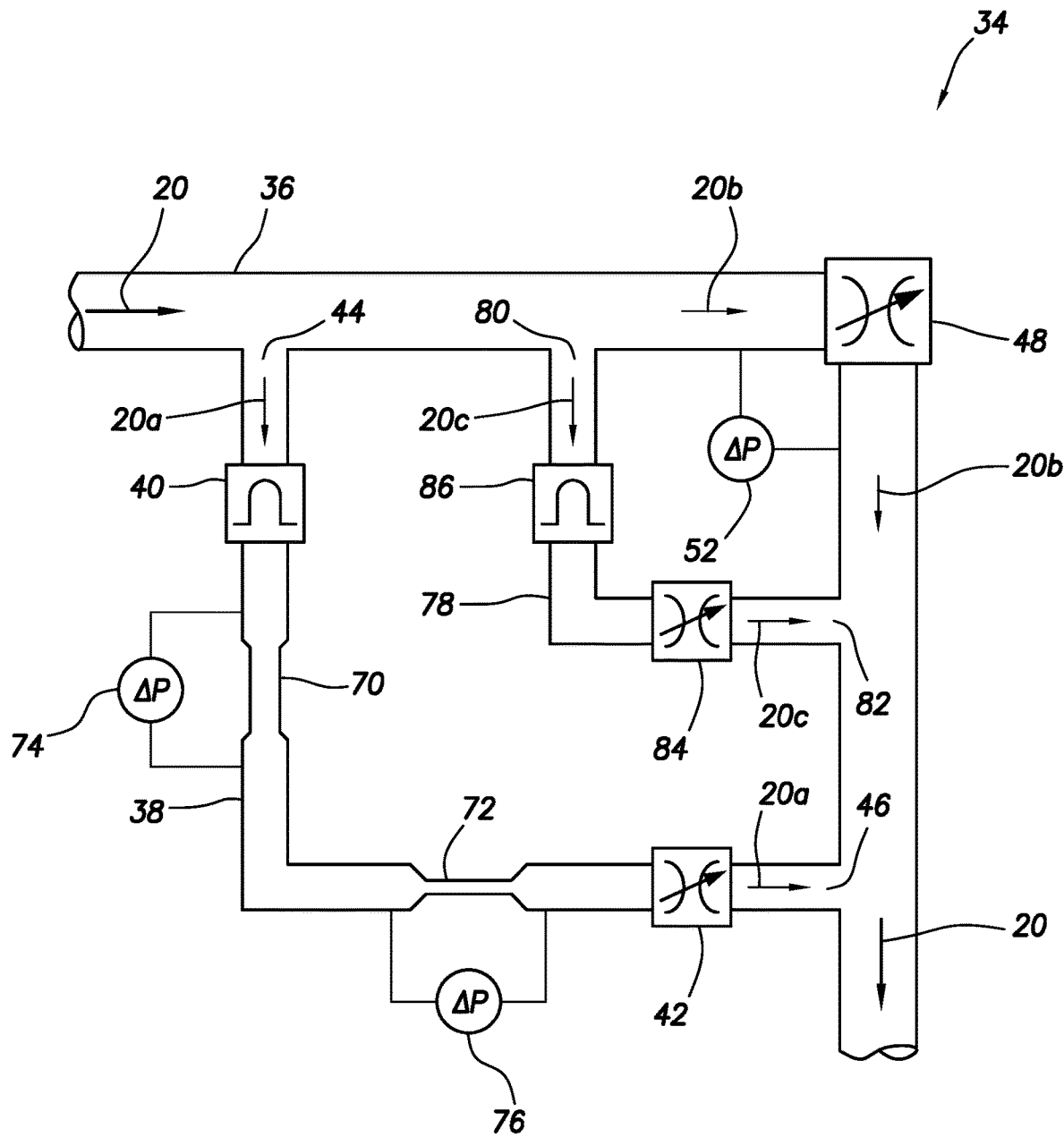
FIG. 5 is a representative schematic view of another example of the rheology measurement apparatus.

Referring additionally now to FIG. 5, another example of the rheology measurement apparatus 34 is representatively illustrated. The FIG. 5 apparatus 34 is described below as it may be used in the FIG. 1 system 10 and method, but the apparatus may be used in other systems and methods in keeping with the scope of this disclosure.

In the FIG. 5 apparatus 34, two pipe viscometers 70, 72 are used in the bypass flow passage 38, instead of the viscometer 57. The pipe viscometers 70, 72 in this example include differential pressure sensors 74, 76 that measure differential pressure across reduced flow areas of the respective viscometers relative to a flow area of the bypass flow passage 38.

The pipe viscometers 70, 72 in this example enable the viscosity of the fluid in the bypass flow passage 38 to be determined at multiple shear rates for the same flow measured by the mass flowmeter 40. For example, the viscometers 70, 72 may comprise lengths of pipe having respective different flow areas. As depicted in FIG. 5, the pipe viscometer 72 has less flow area compared to that of the pipe viscometer 70. Viscometers of the type known to those skilled in the art as slit viscometers may be used in some examples. The viscometers 70, 72 may be used with any of the other rheology measurement apparatus 34 examples described herein.

To determine the viscosity of the fluid in the bypass flow passage 38, the pressure differentials across the viscometers 70, 72 are measured. The apparent viscosity $\eta_a$ is calculated for the apparent shear rate in each viscometer. For shear rates where the fluid exhibits Newtonian characteristics (as in the section 56*b* of the FIG. 4 curve 56), the apparent viscosity is the same as the true viscosity. For shear rates where the fluid exhibits non-Newtonian characteristics (as in the section 56*a* of the FIG. 4 curve 56), the apparent viscosity is not true viscosity. In order to obtain true viscosity, the apparent viscosities are measured at multiple apparent shear rates. Then true viscosities η at various shear rates are calculated, for example, using the Weissenberg-Rabinowitsch-Mooney correction factor:

$$1/\eta = (1/2\eta_a)(2 + (d \ln \dot{y}_a / d \ln \sigma)) \qquad (10)$$

where $\dot{y}_a$ is the apparent shear rate and σ is the shear stress.

Note that, in the FIG. 5 example, the variable flow restrictor 42 does not need to have multiple orifices 58*a-c* with known, repeatable restrictions to fluid flow. Thus, a conventional valve or variable flow restrictor (such as, a choke or control valve) may be used.

As depicted in FIG. 5, the apparatus 34 includes another bypass flow passage 78 connected in parallel with the main flow passage 36 and the bypass flow passage 38. In this example, the bypass flow passage 78 has an inlet 80 downstream of the inlet 44 and upstream of the variable flow restrictor 48, and an outlet 82 downstream of the variable flow restrictor 48 and upstream of the outlet 46.

A portion 20c of the fluid flow 20 passes through the bypass flow passage 78 when a variable flow restrictor 84 connected in the bypass flow passage is open. A mass flowmeter 86 connected in the bypass flow passage 78 is used to measure mass flow rate and density of the fluid flow portion 20c.

In normal operation, the variable flow restrictor 42 can be closed, in which case all of the fluid flow 20 will pass through the variable flow restrictor 48 (fluid flow portion 20b) and the bypass flow passage 78 (fluid flow portion 20c). The techniques described above can be used to determine the flow rate of the fluid flow 20, based on the measurements provided by the mass flowmeter 86 and the differential pressure sensor 52. When it is desired to determine the viscosity of the fluid, the variable flow restrictor 42 is opened, thereby allowing the fluid flow portion 20a to flow through the bypass flow passage 38, at which time the viscometers 70, 72 can be used to determine the viscosity of the fluid.

It is not necessary to change the flow rate output of the pump 18 in order to determine the viscosity of the fluid using the FIG. 5 apparatus 34. Zero drift error in the measurements taken by the differential pressure sensors 74, 76 can be readily eliminated or reduced by frequently reducing the fluid flow portion 20a to zero flow rate, and this can be accomplished while continuously determining the flow rate of the fluid flow 20 using the mass flowmeter 86.

Referring additionally now to FIG. 6, another example of the rheology measurement apparatus 34 is representatively illustrated. The FIG. 6 apparatus 34 is similar in many respects to the FIG. 2 apparatus, but differs at least in that a second differential pressure sensor 88 is connected to the main flow passage 36, so that it measures differential pressure across the variable flow restrictor 48. The differential pressure sensor 88 may be used with the other rheology measurement apparatus 34 examples of FIGS. 2 & 5.

In addition, the control system 54 is depicted in FIG. 6. The control system 54 in this example can control operation of the choke manifold 28 and the pump 18, in part based on the measurements provided by the mass flowmeter 40, the differential pressure sensors 50, 52, 88 and the viscosity sensor 57. The control system 54 can also control operation of the variable flow restrictors 42, 48.

The control system 54 can include one or more processors, a programmable logic controller, memory, input and output devices, and a connection to remote locations (such as, via wired or wireless communication, satellite or internet). The control system 54 can be provided with data, databases, algorithms and programmed instructions for controlling operation of the choke manifold 28, the pump 18 and the variable flow restrictors 42, 48, based in part on the outputs of the mass flowmeter 40, the differential pressure sensors 50, 52, 88 and the viscosity sensor 57. The algorithms and programmed instructions can include mathematical algorithms (such as, spline interpolation, moving least squares and kriging) and artificial intelligence (such as, neural networks, genetic algorithms and adaptive learning).

The control system 54 depicted in FIG. 6 may be used with any of the other rheology measurement apparatus 34 examples of FIGS. 2 & 5.

It will be appreciated that, in the FIG. 6 apparatus 34, there are three available means for measuring flow rate. The mass flowmeter 40 measures density and mass flow rate through the bypass flow passage 38. The flow rate of the fluid flow portion 20a through the bypass flow passage 38 can be used to determine the flow rate of the fluid flow portion 20b through the main flow passage (for example, as described in US publication no. 2022/0282586), and the flow rate of the fluid flow 20 is equal to the sum of the flow rates of the fluid flow portions 20a and 20b. In addition, the flow rate of the fluid flow portion 20b can be determined using the measurements provided by the differential pressure sensors 52, 88, using a known Cv curve for the variable flow restrictor 48.

Individually, any of the measurements provided by the mass flowmeter 40 and the differential pressure sensors 52, 88 can be used to determine the flow rate of the fluid flow 20. Due to its enhanced accuracy, it is generally preferred to use the measurements provided by the mass flowmeter 40. However, in certain circumstances (such as, when the variable flow restrictor 42 is being actuated to shift between positions, or if the mass flowmeter should malfunction), the measurements provided by the differential pressure sensors 52, 88 can be used.

The control system 54 can include one or more algorithms for determining whether the measurements provided by the mass flowmeter 40 or the sensors 52, 88 should be used for the determination of the flow rate of the fluid flow 20. For example, when the variable flow restrictor 42 is being actuated between its positions, or in the event that a malfunction of the mass flowmeter 40 is detected, the measurements provided by the sensors 52, 88 can be selected for use in the determination of the fluid flow 20a flow rate (e.g., if the mass flowmeter 40 malfunctions, then the measurements provided by the sensors 52, 88 can be used to determine the flow rate of the fluid flow 20b, and hence the flow rate of the fluid flow 20a by difference (fluid flow 20 flow rate-fluid flow 20a flow rate=fluid flow 20b flow rate)). The algorithm can be designed to exclude any measurements that are outside of a predicted or expected range, less than a certain minimum threshold, or greater than a maximum threshold.

It may now be fully appreciated that the above disclosure provides significant advancements to the art of determining rheological parameters of fluid flow in a well operation. In examples described above, the rheology measurement apparatus 34 provides for measurement of a viscosity of the fluid flow 20 at both high and low shear rates, so that a curve-fitting technique has enhanced accuracy (such as, for determining the Herschel Bulkley parameters n, k, To).

A method of determining a viscosity of a fluid in real time as the fluid flows in a subterranean well is provided to the art by the above disclosure. In one example, the method comprises: connecting a main flow passage 36 between a pump 18 and a tubular string 12 extending into the well, so that the fluid flows from the pump 18 to the tubular string 12 through the main flow passage 36; connecting a bypass flow passage 38 in parallel with the main flow passage 36, so that an inlet 44 of the bypass flow passage 38 is in communication with a first section of the main flow passage 36 and an outlet 46 of the bypass flow passage 38 is in communication with a second section of the main flow passage 36 downstream of the first section; connecting a mass flowmeter 40 and a variable flow restrictor 42 in the bypass flow passage 38, so that the fluid flows through the mass flowmeter 40 and the variable flow restrictor 42; and connecting at least one viscometer 57, 70, 72 to the bypass flow passage 38.

The method can include determining parameters (n, K, To) of a Herschel Bulkley viscosity curve by measuring differential pressures across the mass flowmeter 40 at relatively low flow rates of the fluid through the bypass flow passage 38, and measuring a viscosity of the fluid at a relatively high flow rate through the bypass flow passage 38.

The determining step can include operating the variable flow restrictor 42 to permit flow of the fluid through the bypass flow passage 38 at the relatively low and relatively high flow rates, without changing an output of the pump 18.

The determining step can include operating the variable flow restrictor 42 to permit flow of the fluid through the bypass flow passage 38 at the relatively low and relatively high flow rates, without changing a flow rate of the fluid from the pump 18 to the tubular string 12.

The relatively low flow rates may comprise first, second and third relatively low flow rates, and the step of measuring differential pressures may comprise measuring the differential pressure across the mass flowmeter 40 at the first relatively low flow rate, then measuring the differential pressure across the mass flowmeter 40 at the second relatively low flow rate, then measuring the differential pressure across the mass flowmeter 40 at the first relatively low flow rate, then measuring the differential pressure across the mass flowmeter 40 at the third relatively low flow rate, and then measuring the differential pressure across the mass flowmeter 40 at the first relatively low flow rate.

The method may include connecting a flow restrictor 48 in the main flow passage 36 between the inlet 44 and the outlet 46 of the bypass flow passage 38. The step of measuring the pressure differentials across the mass flow meter 40 can include measuring the pressure differentials across the mass flow meter 40 with a first differential pressure sensor 50. The method can further include measuring pressure differentials across the flow restrictor 48 in the main flow passage 36 with second and third differential pressure sensors 52, 88.

The method may include evaluating measurement outputs of the first, second and third differential pressure sensors 50, 52, 88, and determining a flow rate of the fluid through the main flow passage 36 while excluding from the determining of the flow rate any of the outputs of the first, second and third differential pressure sensors 50, 52, 88 that are outside of a predicted range.

The fluid may exhibit non-Newtonian behavior at the relatively low flow rates, and the fluid may exhibit Newtonian behavior at the relatively high flow rate. At the relatively high flow rate, a shear stress in the fluid may be proportional to a shear rate in the fluid. At the relatively low flow rates, the shear stress in the fluid may not be proportional to the shear rate in the fluid.

The "at least one" viscometer may be a first pipe viscometer 70. The method may include measuring a differential pressure across a reduced flow area of the first pipe viscometer 70. The "at least one" viscometer may include a second pipe viscometer 72. The method may include measuring a differential pressure across a reduced flow area of the second pipe viscometer 72. The flow area of the second pipe viscometer 72 may be less than the flow area of the first pipe viscometer 70.

The method may include controlling a well operation in response to outputs of the mass flowmeter 40 and the at least one viscometer 57, 70, 72.

The above disclosure also provides to the art a rheology measurement apparatus 34 for use with a subterranean well.

In one example, the rheology measurement apparatus 34 can comprise: a main flow passage 36 configured to connect between a pump 18 and a tubular string 12 extending into the well; a first bypass flow passage 38 connected in parallel with the main flow passage 36, an inlet 44 of the first bypass flow passage 38 in communication with a first section of the main flow passage 36, and an outlet 46 of the first bypass flow passage 38 in communication with a second section of the main flow passage 36 downstream of the first section; a first mass flowmeter 40 connected in the first bypass flow passage 38; and a first pipe viscometer 70 connected in the first bypass flow passage 38.

The apparatus 34 can include a second pipe viscometer 72 connected in the first bypass flow passage 38, the second pipe viscometer 72 having a flow area that is less than a flow area of the first pipe viscometer 70.

The apparatus 34 can include a first variable flow restrictor 42 connected in the first bypass flow passage 38. The apparatus 34 can include a second variable flow restrictor 48 connected in the main flow passage 36 between the first and second main flow passage sections.

The apparatus 34 may include a second bypass flow passage 78 connected in parallel with the main flow passage 36, an inlet 80 of the second bypass flow passage 78 in communication with the first section of the main flow passage 36, and an outlet 82 of the second bypass flow passage 78 in communication with the second section of the main flow passage 36, and a second mass flowmeter 86 connected in the second bypass flow passage 78. The apparatus 34 may also include a variable flow restrictor 84 connected in the second bypass flow passage 78.

The apparatus 34 may comprise: a variable flow restrictor 48 connected in the main flow passage 36 between the first and second sections of the main flow passage 36; a first differential pressure sensor 52 configured to measure a differential pressure across the variable flow restrictor 48; a second differential pressure sensor 88 configured to measure the differential pressure across the variable flow restrictor 48; and a control system 54 configured to determine a flow rate of fluid flow 20 through the main flow passage 36 and to exclude from the flow rate determination any of the outputs of the first and second differential pressure sensors 52, 88 that are outside of a predicted range.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of determining a viscosity of a fluid in real time as the fluid flows in a subterranean well, the method comprising:
    connecting a main flow passage between a pump and a tubular string extending into the well, so that the fluid flows from the pump to the tubular string through the main flow passage;
    connecting a flow restrictor in the main flow passage;
    connecting a bypass flow passage in parallel with the main flow passage, so that an inlet of the bypass flow passage is in communication with a first section of the main flow passage and an outlet of the bypass flow passage is in communication with a second section of the main flow passage downstream of the first section;
    connecting a mass flowmeter and a variable flow restrictor in the bypass flow passage, so that the fluid flows through the mass flowmeter and the variable flow restrictor; and
    connecting at least one viscometer to the bypass flow passage.

2. The method of claim 1, further comprising determining parameters of a Herschel Bulkley viscosity curve by measuring differential pressures across the mass flowmeter at relatively low flow rates of the fluid through the bypass flow passage, and measuring a viscosity of the fluid at a relatively high flow rate through the bypass flow passage.

3. The method of claim 2, in which the determining comprises operating the variable flow restrictor to permit flow of the fluid through the bypass flow passage at the relatively low and relatively high flow rates, without changing an output of the pump.

4. The method of claim 2, in which the determining comprises operating the variable flow restrictor to permit flow of the fluid through the bypass flow passage at the relatively low and relatively high flow rates, without changing a flow rate of the fluid from the pump to the tubular string.

5. The method of claim 2, in which the relatively low flow rates comprise first, second and third relatively low flow rates, and in which the measuring differential pressures comprises measuring the differential pressure across the mass flowmeter at the first relatively low flow rate, then measuring the differential pressure across the mass flowmeter at the second relatively low flow rate, then measuring the differential pressure across the mass flowmeter at the first relatively low flow rate, then measuring the differential pressure across the mass flowmeter at the third relatively low flow rate, and then measuring the differential pressure across the mass flowmeter at the first relatively low flow rate.

6. The method of claim 5, in which the connecting the flow restrictor in the main flow passage further comprises connecting the flow restrictor in the main flow passage between the inlet and the outlet of the bypass flow passage.

7. The method of claim 6, in which the measuring the pressure differentials across the mass flow meter comprises measuring the pressure differentials across the mass flow meter with a first differential pressure sensor, and further comprising measuring pressure differentials across the flow restrictor in the main flow passage with second and third differential pressure sensors.

8. The method of claim 7, further comprising evaluating measurement outputs of the first, second and third differential pressure sensors, and determining a flow rate of the fluid through the main flow passage while excluding from the determining of the flow rate any of the outputs of the first, second and third differential pressure sensors that are outside of a predicted range.

9. The method of claim 2, in which the fluid exhibits non-Newtonian behavior at the relatively low flow rates, and the fluid approaches pseudo-Newtonian or approximate Newtonian and/or Newtonian behavior at the relatively high flow rate.

10. The method of claim 2, in which at the relatively high flow rate a shear stress in the fluid approaches proportionality to a shear rate in the fluid.

11. The method of claim 1, in which the at least one viscometer comprises a first pipe viscometer, and the method further comprises measuring a differential pressure across a reduced flow area of the first pipe viscometer.

12. The method of claim 11, in which the at least one viscometer comprises a second pipe viscometer, and the method further comprises measuring a differential pressure across a reduced flow area of the second pipe viscometer, the flow area of the second pipe viscometer being less than the flow area of the first pipe viscometer.

13. The method of claim 1, further comprising controlling a well operation in response to outputs of the mass flowmeter and the viscometer.

14. A rheology measurement apparatus for use with a subterranean well, the rheology measurement apparatus comprising:
    a main flow passage configured to connect between a pump and a tubular string extending into the well;
    a flow restrictor connected in the main flow passage;
    a first bypass flow passage connected in parallel with the main flow passage, an inlet of the first bypass flow passage in communication with a first section of the main flow passage, and an outlet of the first bypass flow passage in communication with a second section of the main flow passage downstream of the first section;
    a first mass flowmeter connected in the first bypass flow passage; and
    a first pipe viscometer connected in the first bypass flow passage.

15. The apparatus of claim 14, further comprising a second pipe viscometer connected in the first bypass flow passage, the second pipe viscometer having a flow area that is less than a flow area of the first pipe viscometer.

16. The apparatus of claim 14, further comprising a first variable flow restrictor connected in the first bypass flow passage.

17. The apparatus of claim 16, in which the flow restrictor connected in the main flow passage comprises a second variable flow restrictor connected in the main flow passage between the first and second main flow passage sections.

18. The apparatus of claim 14, further comprising:
a second bypass flow passage connected in parallel with the main flow passage, an inlet of the second bypass flow passage in communication with the first section of the main flow passage, and an outlet of the second bypass flow passage in communication with the second section of the main flow passage; and
a second mass flowmeter connected in the second bypass flow passage.

19. The apparatus of claim 18, further comprising a variable flow restrictor connected in the second bypass flow passage.

20. The apparatus of claim 14, in which the flow restrictor connected in the main flow passage comprises a variable flow restrictor connected in the main flow passage between the first and second sections of the main flow passage; and further comprising:
a first differential pressure sensor configured to measure a differential pressure across the variable flow restrictor;
a second differential pressure sensor configured to measure the differential pressure across the variable flow restrictor; and
a control system configured to determine a flow rate of fluid flow through the main flow passage and to exclude from the flow rate determination any of the outputs of the first and second differential pressure sensors that are outside of a predicted range.

* * * * *